No. 893,425. PATENTED JULY 14, 1908.
J. F. BELL.
VEGETABLE CUTTER.
APPLICATION FILED DEC. 7, 1905.
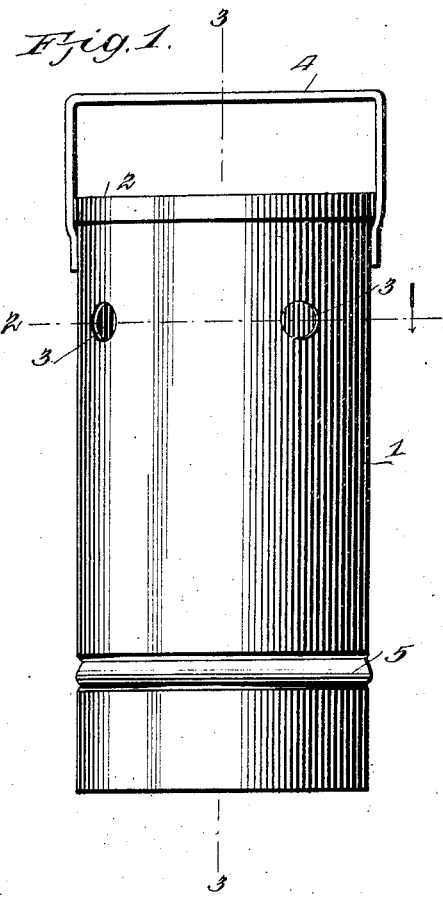
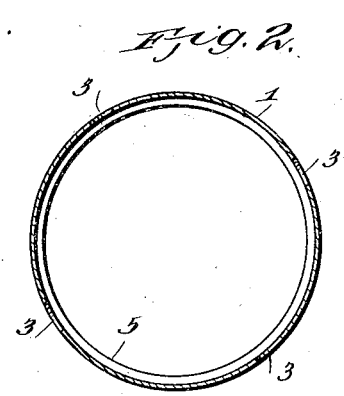
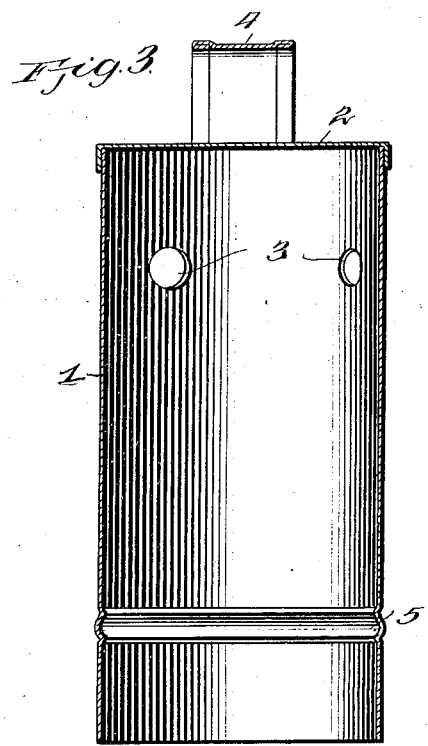
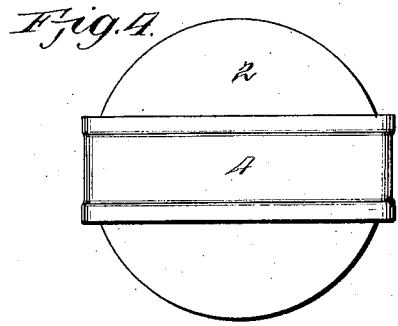
Witnesses
Frank Hough
D. S. Elmor
Inventor
J. F. Bell
By Victor J. Evans
Attorney

UNITED STATES PATENT OFFICE.

JUNIUS F. BELL, OF SCHENECTADY, NEW YORK.

VEGETABLE-CUTTER.

No. 893,425.  Specification of Letters Patent.  Patented July 14, 1908.

Application filed December 7, 1905. Serial No. 290,762.

*To all whom it may concern:*

Be it known that I, JUNIUS F. BELL, a citizen of the United States, residing at Schenectady, in the county of Schenectady and State of New York, have invented new and useful Improvements in Vegetable-Cutters, of which the following is a specification.

This invention relates to vegetable cutters designed especially for chopping potatoes in the operation of preparing them to be cooked and has for its object to produce a simple inexpensive device of this character which may be conveniently manipulated and one from which the air steam or the like will freely escape while in action.

With these and other objects in view the invention comprises the novel features of construction and combination of parts more fully hereinafter described.

In the accompanying drawings, Figure 1 is a side elevation of a chopper embodying the invention. Fig. 2 is a cross section taken on the line 2—2 of Fig. 1. Fig. 3 is a central longitudinal section taken on the line 3—3 of Fig. 1. Fig. 4 is a top plan view of the chopper.

Referring to the drawings, 1 designates the body of the chopper composed preferably of sheet metal and of cylindrical tubular form and having its upper end closed by a cap 2, the lower end of the body being open as shown.

Terminally attached to the body 1, which is provided adjacent its upper end with a plurality of air openings or vents 3, is a sheet metal handle 4 of substantially U-form and extended diametrically across the cap 2 from which it is spaced. The said body is provided at a point adjacent its open or cutting end with an annular circumferential corrugation 5 presenting a convex exterior surface, a concave interior surface and spaced annular ribs at its sides, said ribs projecting from the inner face of said tubular body and forming contracted portions therein.

In practice, the chopper is manipulated by grasping the handle 4 and bringing the open end of the body repeatedly downward upon the potatoes or other vegetables contained in a bowl or other receptacle whereby the material will be chopped into pieces of a suitable size. During the chopping operation, the steam from hot vegetables and air will freely escape through the vent openings or ports 3 as will be readily understood. The cut surfaces of the pieces would ordinarily adhere or tend to adhere to the opposing inner surface of the chopper, but, owing to the provision of the circumferential corrugation and the ribs at the sides thereof which project from the inner face of the tubular body of the chopper, the said ribs as the cut pieces of vegetables move upwardly in the body by the chopping action of the latter cause the cut surfaces of the pieces, as such surfaces move past such ribs, to be deflected from the inner surface of the tubular body and hence the cut surfaces of the pieces are separated from the inner surface of the body of the chopper and such pieces are caused to fall or drop from the chopper as the latter is raised.

Having thus described the invention, what I claim is:

The herein described vegetable cutter comprising an elongated tubular body open at one end and closed at the other, said body having a handle at its closed end and provided with vent openings near its closed end, said body further provided at a point adjacent its open or cutting end with an annular circumferential corrugation presenting a convex exterior surface, a concave interior surface and spaced annular ribs at its sides, said ribs projecting beyond the inner face of said tubular body and forming contracted portions therein for separating the cut vegetables and preventing their adherence to the body.

In testimony whereof, I affix my signature in presence of two witnesses.

JUNIUS F. BELL.

Witnesses:
 F. H. REED,
 H. C. GRUPE.